Aug. 7, 1923.
H. A. ZETTEL
AIRPLANE
Filed Nov. 18, 1919
1,463,917
4 Sheets-Sheet 1
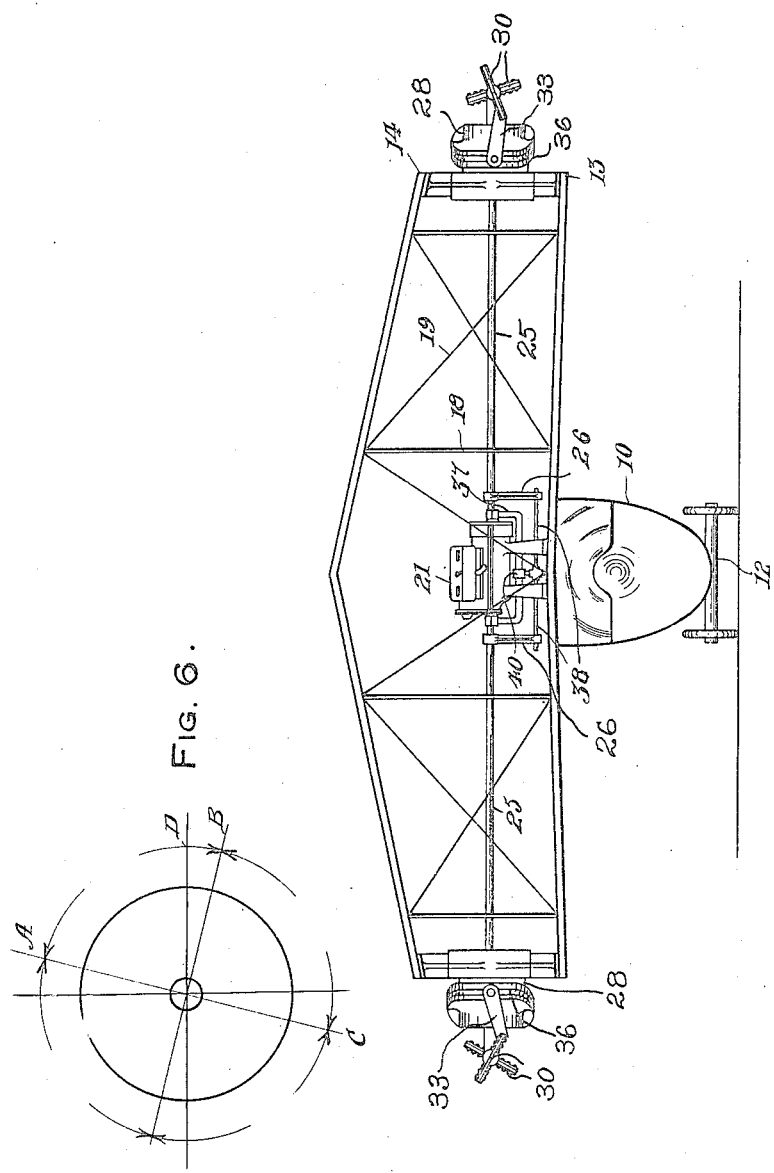

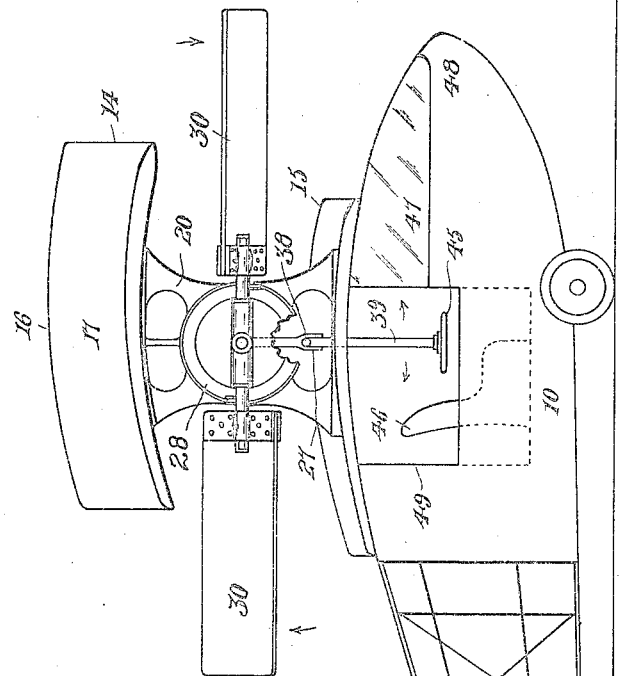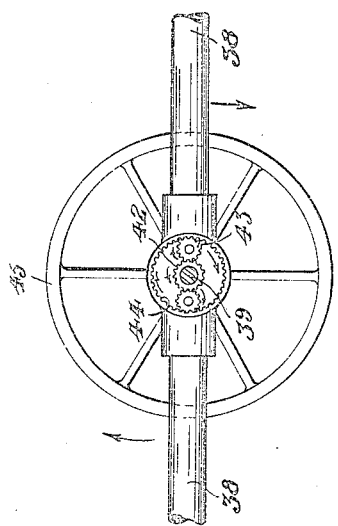

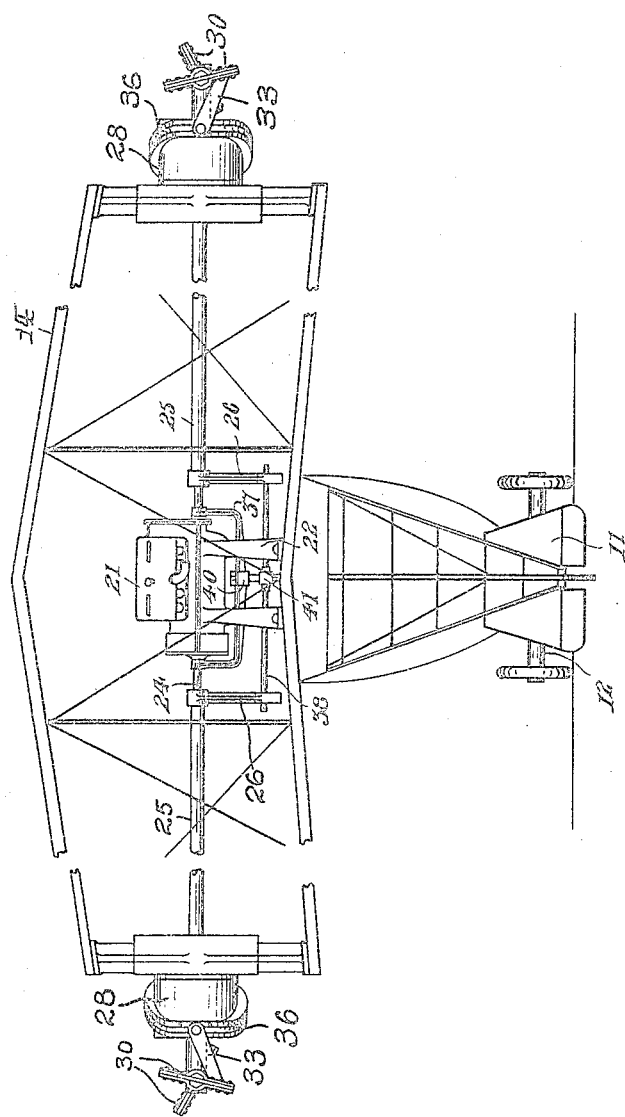

Aug. 7, 1923.
H. A. ZETTEL
1,463,917
AIRPLANE
Filed Nov. 18, 1919 4 Sheets-Sheet 4
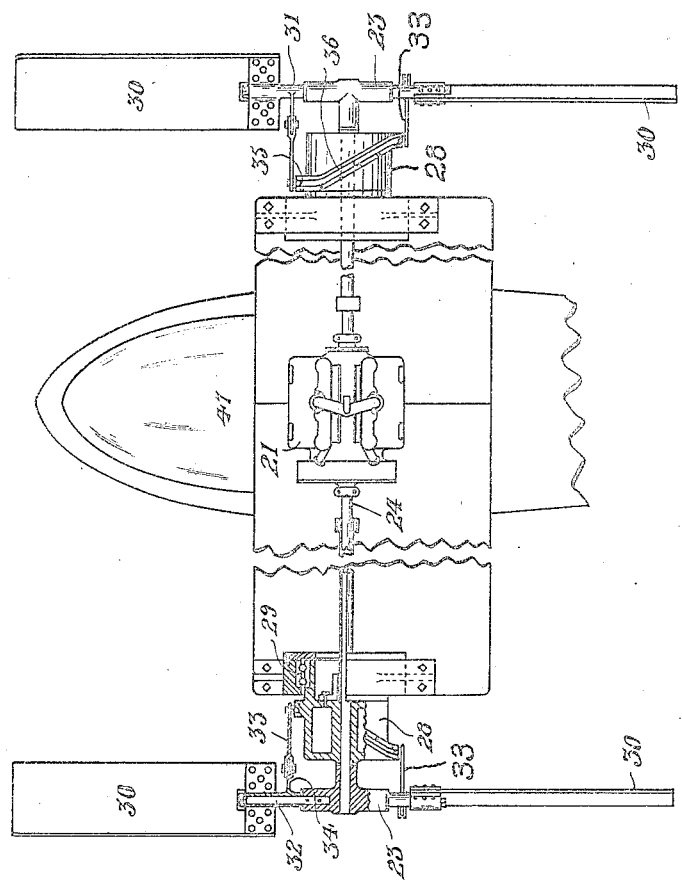
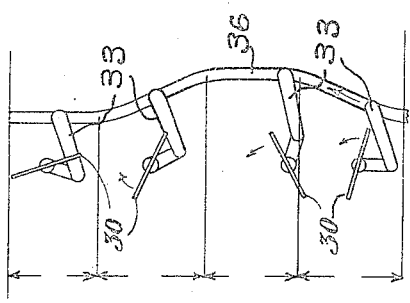
Inventor
Herbert A. Zettel
By [signature]
Attorney Patented Aug. 7, 1923.

1,463,917

UNITED STATES PATENT OFFICE.

HERBERT A. ZETTEL, OF ST. PAUL, MINNESOTA.

AIRPLANE.

Application filed November 18, 1919. Serial No. 338,836.

*To all whom it may concern:*

Be it known that I, HERBERT A. ZETTEL, a citizen of the United States, residing at St. Paul, in the county of Ramsey and State of Minnesota, have invented a new and useful Improvement in Airplanes, of which the following is a specification.

The primary object of the invention is the provision of an aircraft adapted for propulsion at points free from the air interference offered by different portions of the craft whereby maximum efficiency is obtained combined with nicety of control during flight.

A further object of the invention is the provision of propelling means for aircraft automatically controlled with feathering blades and manually adjustable for accurate steering purposes, the controlling means being such that substantially vertical or ascents at sharp angles is readily accomplished.

A still further object of the invention is the provision of a propeller driven and steered aeroplane whereby the pilot may cause the craft to travel in any desired direction by easily shifting the propellers simultaneously with the automatic feathering of the propeller blades during operation.

With these general objects in view, the invention consists of the novel combination and arrangement of parts hereinafter more fully described in connection with the accompanying drawings, and then claimed.

In the drawings forming a part of this application like reference characters designate corresponding parts throughout the several views, and Figure 1 is a front elevation of the craft, Figure 2 is a side view thereof partially broken away, Figure 3 is a rear elevational view of the same broken away, Figure 4 is a top plan view of the craft with parts broken away, Figure 5 is a detail view of the planetary steering gears, Figure 6 is a diagrammatic view of the cycle of operation of the propeller blades and Figure 7 is a geometric development of the cam control for the feathering blades.

My aeroplane combines helicopter and aerodynamic principles being constructed for upward as well as forward flight it being understood that a body suspended in air loses an amount of weight equal to the pressure of air conveyed from above to a point below the body causing the partial vacuum thereabove for exerting a lifting power as well as utilizing the increased air pressure below the body.

In carrying out the principles of my invention I have illustrated one embodiment of aircraft adapted for this purpose and consisting of a fuselage 10, an empennage 11. and a chassis 12.

My aircraft is in the form of a bi-plane with a lower transverse plane 13, mounted upon the fuselage 10 and with an upper plane 14, positioned thereabove, the said planes having central dividing lines or ridges 15 and 16, relatively with downwardly inclined halves 17 downwardly projecting at opposite sides of the craft. Suitable struts 18 and stay wires 19 between the planes 13 and 14 serve to strengthen the structure while upright frames 20 are connected between the planes at the opposite ends thereof.

A suitable motor 21 is centrally mounted between the aerofoils or lifting planes 13 and 14 with legs 22 secured to the lower plane 13, above the fuselage 10. A direct drive for T-shaped propeller hubs 23 outwardly of the frames 20 is provided by keying or otherwise securing the hubs 23 upon the opposite outer ends of the crank shaft 24, of the motor 21. Tubular members or sleeves 25 are journaled upon the opposite end portions of the shaft 24, each of said sleeves having a depending lever 26 with a bifurcated lower end 27 positioned at opposite sides of the motor 21 while cam drums 28 are attached to the free ends of the sleeves 25 and journaled in anti-friction bearings 29 centrally of the frames 20. The propellers being two-bladed, the blades 30 thereof have journals 31 rotatably mounted upon axles 32 oppositely projecting from the hubs 23 whereby the blades 30 revolve with the hubs 23 capable of independent axial rotation upon the axles 32. Links 33 are pivoted to lugs 34 upon the journals 31 with the inner ends of the links 33 having ball members 35, slidable in cam grooves 36, around the drums 28. During the normal rotation of the hubs 23 by the motor 21, the links 33 will cause the blades 30 to automatically "feather" during their recovery stroke it being understood that the forward downward movements of the blades constitutes the power stroke regulated in the manner hereinafter described for exerting different degrees of lifting and forward driving power to the craft. The blades 30 are designed for positioning at an angle to the frames 20 during their propelling movements or in other words, the lateral dimension of each blade 30, will project upwardly and outwardly from the plane of the adjacent frame 20 during the downward power stroke of the blade.

This manner of operation serves to draw the air downwardly from the sloping upper aerofoil 14 and forcing the air beneath the concaved lower aerofoil 13. The formation of a partial vacuum above the planes draws the craft upwardly assisted by the upward pressure of the air forcibly circulated to a point beneath the lower plane 13 at opposite sides of the fuselage 10. A U-shaped yoke 37 swings upon the motor shaft 24 beneath the motor and between the legs 22 while an operating shaft 38 for the levers 26 is positioned within the bifurcated ends 27 of the levers 26 beneath the yoke 37. A steering post 39 centrally depends from a thrust bearing 40 carried by the yoke 37, the said post axially extending through a gear casing 41 centrally carried by the shaft 38. A pinion 42 upon the shaft 39 meshes with the pinions 43 within the casing 41 while the pinions 43 in turn mesh within the gear 44 of said casing thereby forming a differential construction whereby the shaft 38 is laterally turned in an opposite direction from the direction of rotation of said shaft 39.

A steering wheel 45 upon the lower end of the shaft 39 is readily accessible from the driver's seat 46 within the fuselage 10 while a transparent panel or window 47 in the forward nose or bow portion 48 of the fuselage permits the pilot free visual access forwardly of the craft while side openings or windows 49 may be provided of any form in said fuselage 10. The feathering action of the two blades 30 of each propeller occur at uniform points in the path of rotation of the blades and under normal conditions the two propellers feather simultaneously so that their power and recovery strokes occur together for beating downwardly and rearwardly through the air. This uniform feathering operation of the blades of the two propellers is shifted to different points of rotation by oscillating the post 39 upon the longitudinal axis of the fuselage 10. This is accomplished by shifting the yoke 37, shaft 38 and levers 26 upon the swinging movement of the post 39, the movement of the levers 26 partially rotating the sleeves 25 and drums 28 and the shifting of the cam slots 36 changes the timing of the partial rotation of the blade journals 31 upon the axles 32 and regulates the position of the power stroke of the propeller blades. The power stroke of the blades 30 occurs in their path of travel through the arc AB, Figure 6, when the power is primarily designed for upward movement of the aircraft and upon the arc BC when forward propelling power is primarily desired.

The travel of the propeller blade 30 through the arc AB however exerts a compound lift and pull, the pulling action occurring through the third arc BC as shown in Figure 6.

The steering operation accomplished by the post 39 turned by the wheel 45, is effected by shifting the cam drums 28 in opposite directions and whereby the blades 30 of the propeller at one side of the craft will be shifted for exerting greater lifting or pulling power to that side thereof while the blades of the opposite propeller will be oppositely shifted thereby decreasing the power of such propeller. In this manner, the turning of the wheel of the propeller toward the right causes the change in power between the right and left propellers to turn the aircraft in a right hand direction while a left hand turn of the wheel 45 steers the craft toward the left. The complete control is had through the wheel 45 for oscillating the post 39 to change the timing of the propellers for simultaneously lifting or pulling operation and also for oppositely shifting the blades of the two propellers to steer the craft through any desired maneuvers in aerial travel. By this simple construction, the propellers being outwardly of the sides of the craft, are free from all air interference and their position for operation as set forth causes the craft to rise at sharp angles into the air and to travel therethrough at will under the accurate control of the steering mechanism effected and made possible by the controlled operation of the cam drums 28.

While the form of the invention herein set forth is believed preferable it will be understood that various changes may be made therein without departing from the spirit and scope of the invention as claimed, it being understood that a plurality of propellers can be used upon each side of the craft if found desirable.

What I claim as new and desire to secure by Letters Patent is:—

1. An air craft comprising a longitudinal frame work, a transverse aerofoil mounted on said frame work and extending outwardly beyond the same on the sides thereof, said aerofoil inclining laterally from the center point thereof to the outer ends, and vertically revoluble propellers positioned outwardly of the lowermost ends of the aerofoil adapted for exhausting the air above the aerofoil during the upward movement of the craft.

2. An air craft comprising a longitudinal frame work, a transverse aerofoil mounted on said frame work and extending outwardly beyond the same on the sides thereof, said aerofoil inclining laterally from the center point thereof to the outer ends, and vertically revoluble propellers positioned outwardly of the lowermost ends of the aerofoil adapted for exhausting the air above the aerofoil during the upward movement of the craft, said propellers being adapted for forcing the air beneath the aerofoil whereby upward pressure is exerted on the craft.

3. An aircraft comprising a fuselage, upper and lower planes transversely carried thereby with the end portions of the planes downwardly inclined from the central ridge thereof, upright frames connected between the outer ends of the planes, bladed propellers mounted for rotation in a vertical plane at the outer end of said frames and adjusting cams for the blades of said propellers journaled in said frames.

4. An aircraft comprising a fuselage, upper and lower planes transversely carried thereby with the end portions of the planes downwardly inclined from the central ridge thereof, upright frames connected between the outer ends of the planes, bladed propellers mounted for rotation outwardly of said frames, adjusting cams for the blades of said propellers journaled in said frames, a motor between said planes having its shaft projecting through the frames and cams operatively connected to said propellers, sleeves journaled upon said shaft at opposite sides of the motor and secured to said cams and shifting means for the sleeves.

5. An aircraft comprising a fuselage, upper and lower planes transversely carried thereby with the end portions of the planes downwardly inclined from the central ridge thereof, upright frames connected between the outer ends of the planes, bladed propellers mounted for rotation outwardly of said frames, adjusting cams for the blades of said propellers journaled in said frames, a motor between said planes having its shaft projecting through the frames and cams operatively connected to said propellers, sleeves journaled upon said shaft at opposite sides of the motor, and secured to said cams, adjusting levers depending from the adjacent inner ends of the sleeves and means adapted for oscillating said levers in the same or opposite direction at will.

6. An aircraft comprising a fuselage, transverse planes mounted thereon, frames between the ends of the planes, a cam drum journaled in the outer end of each frame, a propeller mounted for revolution outwardly of each drum including axially journaled blades, and operative connections between said propeller blades and drums whereby the blades of the two propellers are adapted and operate in a vertical plane and to automatically feather simultaneously.

7. An aircraft comprising a fuselage, transverse planes mounted thereon, frames between the ends of the planes, a cam drum journaled in each frame, a propeller mounted for revolution outwardly of each drum including axially journaled blades, operative connections between said propeller blades and drums whereby the blades of the two propellers are adapted to automatically feather simultaneously, and means for manually adjusting the drums simultaneously whereby the feathering of the blades is timed at different points in the plane of revolution.

8. An aircraft comprising a fuselage, transverse planes mounted thereon, frames between the ends of the planes, a cam drum journaled in each frame, a propeller mounted for revolution outwardly of each drum including axially journaled blades, operative connections between said propeller blades and drums whereby the blades of the two propellers are adapted to automatically feather simultaneously, means for manually adjusting the drums simultaneously whereby the feathering of the blades is timed at different points in the plane of revolution, and means associated with the drum-adjusting means whereby the drums are adapted for shifting in opposite directions during the steering operation of the craft during flight.

9. An aircraft comprising a fuselage, upper and lower transverse planes carried thereby, frames between the ends of the planes, a motor centrally between the planes, cam drums journaled in said frames, a power shaft for the motor journaled through said drums, propeller hubs secured to the free ends of said shaft outwardly of the drums, opposite blades journaled upon said hubs and operative connections between the blades of each hub and the adjacently positioned drum whereby the blades are adapted for partial rotation relatively of the hub during rotation of the shaft.

10. An aircraft comprising a fuselage, upper and lower transverse planes carried thereby, frames between the ends of the planes, a motor centrally between the planes, cam drums journaled in said frames, a power shaft for the motor journaled through said drums, propeller hubs secured to the free ends of said shaft outwardly of the drums, opposite blades journaled upon said hubs, operative connections between the blades of each hub and the adjacently positioned drum whereby the blades are adapted for partial rotation relatively of the hub during rotation of the shaft, and shifting means for the drums adapted for operation within the fuselage whereby the drums may be partially rotated in the same or different directions at will.

11. An aircraft comprising a fuselage, upper and lower transverse planes carried thereby, frames between the ends of the planes, a motor centrally between the planes, cam drums journaled in said frames, a power shaft for the motor journaled through said drums, propeller hubs secured to the free ends of said shaft outwardly of the drums, opposite blades journaled upon said hubs, operative connections between the blades of each hub and the adjacently positioned drum whereby the blades are adapted for partial rotation relatively of the hub during rotation of the shaft, a yoke journaled upon the motor shaft depending beneath the motor, a steering post swiveled to the yoke depending into the fuselage and operative connections between said post and drums whereby the drums are adapted for simultaneous shifting during oscillations of the post.

12. An aircraft comprising a fuselage, upper and lower transverse planes carried thereby, frames between the ends of the planes, a motor centrally between the planes, cam drums journaled in said frames, a power shaft for the motor journaled through said drums, propeller hubs secured to the free ends of said shaft outwardly of the drums, opposite blades journaled upon said hubs, operative connections between the blades of each hub and the adjacently positioned drum whereby the blades are adapted for partial rotation relatively of the hub during rotation of the shaft, a yoke journaled upon the motor shaft depending beneath the motor, a steering post swiveled to the yoke depending into the fuselage, sleeves secured to the drums journaled upon the motor shaft, operating levers depending from said sleeves at opposite sides of the motor and operative connections between said post and levers whereby the levers are adapted for swinging in the same or opposite directions at will.

13. An aircraft comprising a fuselage, upper and lower transverse planes carried thereby, frames between the ends of the planes, a motor centrally between the planes, cam drums journaled in said frames, a power shaft for the motor journaled through said drums, propeller hubs secured to the free ends of said shaft outwardly of the drums, opposite blades journaled upon said hubs, operative connections between the blades of each hub, and the adjacently positioned drum whereby the blades are adapted for partial rotation relatively of the hub during rotation of the shaft, a yoke journaled upon the motor shaft depending beneath the motor, a steering post swiveled to the yoke depending into the fuselage, sleeves secured to the drums journaled upon the motor shaft, operating levers depending from said sleeves at opposite sides of the motor, a shaft beneath the yoke loosely connected to the free ends of said levers, a differential casing centrally of said lever shaft through which said post is journaled and differential gear connections between said post and casing whereby the partial rotation of the post is adapted for shifting said lever-shaft in an opposite direction during the adjustment of the propeller blades in the steering of the craft.

HERBERT A. ZETTEL.